(12) United States Patent
Kapur et al.

(10) Patent No.: US 7,707,201 B2
(45) Date of Patent: Apr. 27, 2010

(54) SYSTEMS AND METHODS FOR MANAGING AND USING MULTIPLE CONCEPT NETWORKS FOR ASSISTED SEARCH PROCESSING

(75) Inventors: Shyam Kapur, Sunnyvale, CA (US); Jignashu Parikh, Gujarat (IN); Deepa Joshi, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 619 days.

(21) Appl. No.: 11/295,166

(22) Filed: Dec. 5, 2005

(65) Prior Publication Data
US 2006/0167896 A1    Jul. 27, 2006

Related U.S. Application Data

(60) Provisional application No. 60/634,022, filed on Dec. 6, 2004.

(51) Int. Cl.
G06F 17/30 (2006.01)
G06F 17/00 (2006.01)

(52) U.S. Cl. ...................... 707/706; 707/728

(58) Field of Classification Search ................ 707/1–6
See application file for complete search history.

(56) References Cited

U.S. PATENT DOCUMENTS

| 5,893,092 | A  * | 4/1999 | Driscoll ...................... 707/5 |
| 6,421,675 | B1 * | 7/2002 | Ryan et al. .................. 707/100 |
| 6,728,707 | B1 * | 4/2004 | Wakefield et al. ............. 707/5 |
| 6,766,320 | B1 * | 7/2004 | Wang et al. .................... 707/5 |
| 6,873,982 | B1 * | 3/2005 | Bates et al. .................... 707/5 |
| 6,944,609 | B2 * | 9/2005 | Witbrock ....................... 707/3 |

* cited by examiner

*Primary Examiner*—Yicun Wu
(74) *Attorney, Agent, or Firm*—Seth H. Ostrow; Ostrow Kaufman & Frankl LLP

(57) ABSTRACT

Multiple concept networks are generated from subsets of received queries. These concept networks can be used in various ways to enhance response to subsequent queries. In one embodiment, concept networks can be merged into a larger concept network that can be used to infer a user's likely intent given a query. In another embodiment, suggestions for related searches obtained using different concept networks can be merged or aggregated. Other users for concept networks in query processing, including assisted search, are also described.

8 Claims, 12 Drawing Sheets

SYSTEMS AND METHODS FOR MANAGING AND USING MULTIPLE CONCEPT NETWORKS FOR ASSISTED SEARCH PROCESSING

RELATED APPLICATIONS

This application claims priority to U.S. Provisional Patent Application Ser. No. 60/634,022, filed Dec. 6, 2004 and which is incorporated herein by reference in its entirety.

CROSS-REFERENCES TO RELATED APPLICATIONS

The present disclosure is related to the following commonly assigned co-pending regular U.S. patents and patent applications:

- application Ser. No. 10/713,576, filed Nov. 12, 2003, entitled "Systems and Methods for Generating Concept Units from Search Queries," now Patented as U.S. Pat. No. 7,051,023, issued on May 23, 2006;
- application Ser. No. 10/712,307, filed Nov. 12, 2003, entitled "Systems and Methods for Search Query Processing Using Trend Analysis", now Patented as U.S. Pat. No. 7,240,049, issued on Jul. 3, 2007;
- application Ser. No. 10/797,614, filed Mar. 9, 2004, entitled "Systems and Methods for Application Search Processing Using Superunits," now Patented as U.S. Pat. No. 7,346,629, issued on Mar. 18, 2008;
- application Ser. No. 10/797,586, filed Mar. 9, 2004, entitled "Vector Analysis of Histograms for Units of a Concept Network in Search Query Processing," now Patented as U.S. Pat. No. 7,340,460, issued on Mar. 4, 2008;
- application Ser. No. 10/818,752, filed Apr. 5, 2004, entitled "Universal Search Interface System and Methods,";
- U.S. Pat. No. 7,620,628, issued on Nov. 17, 2009, entitled "Search Processing with Automatic Categorization of Queries"; and
- U.S. Pat. No. 7,428,533, issued on Sep. 23, 2008, entitled "Automatic Generation of Taxonomies for Categorizing Queries and Search Query Processing Using Taxonomies."

The respective disclosures of these applications are incorporated herein by reference for all purposes.

BACKGROUND OF THE INVENTION

The present invention relates generally to network and Internet search and interface systems and more particularly to search systems that provide enhanced search functionality.

With the advent of the Internet and the multitude of web pages and media content available to a user over the World Wide Web (web), there has become a need to provide users with streamlined approaches to filter and obtain desired information from the web. Search systems and processes have been developed to meet the needs of users to obtain desired information. Examples of such technologies can be accessed through Yahoo!, Google and other sites. Typically, a user inputs a query and a search process returns one or more links (in the case of searching the web), documents and/or references (in the case of a different search corpus) related to the query. The links returned may be closely related, or they may be completely unrelated, to what the user was actually looking for. The "relatedness" of results to the query may be in part a function of the actual query entered as well as the robustness of the search system (underlying collection system) used. Relatedness might be subjectively determined by a user or objectively determined by what a user might have been looking for.

Queries that users enter are typically made up of one or more words. For example, "hawaii" is a query, so is "new york city", and so is "new york city law enforcement". As such, queries as a whole are not integral to the human brain. In other words, human beings do not naturally think in terms of queries. They are an artificial construct imposed, in part, by the need to query search engines or look up library catalogs. Human beings do not naturally think in terms of just single words either. What human beings think in terms of are natural concepts. For example, "hawaii" and "new york city" are vastly different queries in terms of length as measured by number of words but for a human being they share one important characteristic: they are each made up of one concept. In contrast, a person regards the query "new york city law enforcement" as fundamentally different because it is made up of two distinct concepts: "new york city" and "law enforcement".

Human beings also think in terms of logical relationships between concepts. For example, "law enforcement" and "police" are related concepts since the police are an important agency of law enforcement; a user who types in one of these concepts may be interested in sites related to the other concept even if those sites do not contain the particular word or phrase the user happened to type. As a result of such thinking patterns, human beings by nature build queries by entering one or more natural concepts, not simply a variably long sequence of single words, and the query generally does not include all of the related concepts that the user might be aware of. Also, the user intent is not necessarily reflected in individual words of the query. For instance, "law enforcement" is one concept, while the separate words "law" and "enforcement" do not individually convey the same user intent as the words combined.

Current technologies at any of the major search providers do not understand queries the same way that human beings create them. For instance, existing search engines generally search for the exact words or phrases the user entered, not for the underlying natural concepts or related concepts the user actually had in mind. This is one reason that prevents search providers from identifying a user's intent and providing optimal search results and content.

As can be seen, there is a need for improved search and interface technology that aids in providing results that are more in line with the actual concepts in which a user may be interested and a better user experience.

BRIEF SUMMARY OF THE INVENTION

Embodiments of the present invention provide systems and methods for processing search requests, including analyzing received queries in order to provide a more sophisticated understanding of the information being sought. A concept network is generated from a set of queries by parsing the queries into units and defining various relationships between the units, e.g., based on patterns of units that appear together in queries. A number of different concept networks can be generated from subsets of the received queries, where the subsets can be grouped based on various dimensions such as time of the query, geographic location of the querying user, user demographics (age, sex, interests, etc.), or contextual or "vertical" metadata pertaining to the query.

According to aspects of the present invention, multiple concept networks can be used in various ways to enhance response to subsequent queries. For instance, some of the concept networks can be merged into a larger concept network that can be used to infer a user's likely intent from a given query. Such inferences in turn can be used to formulate suggestions for what the user might like to explore next. As another example, suggestions resulting from different concept networks can be merged or aggregated to increase the likelihood that the suggestions will be helpful to the user. Other users for concept networks in query processing, including assisted search, are also described.

The following detailed description together with the accompanying drawings provide a better understanding of the nature and advantages of the present invention.

DETAILED DESCRIPTION OF THE INVENTION

Figure 1:
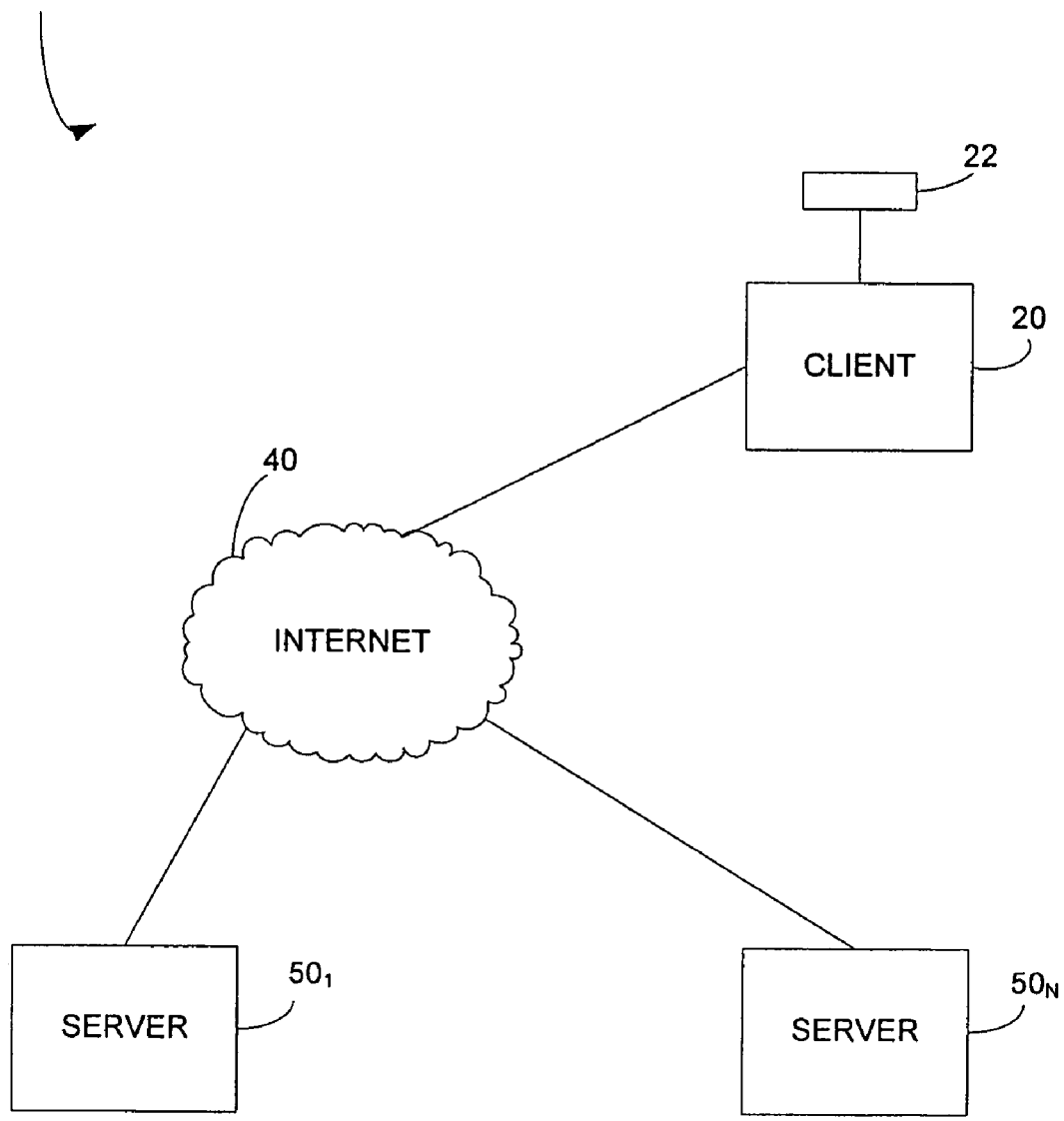
FIG. 1 is a high-level block diagram of an information retrieval and communication system according to one embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

Figure 2:
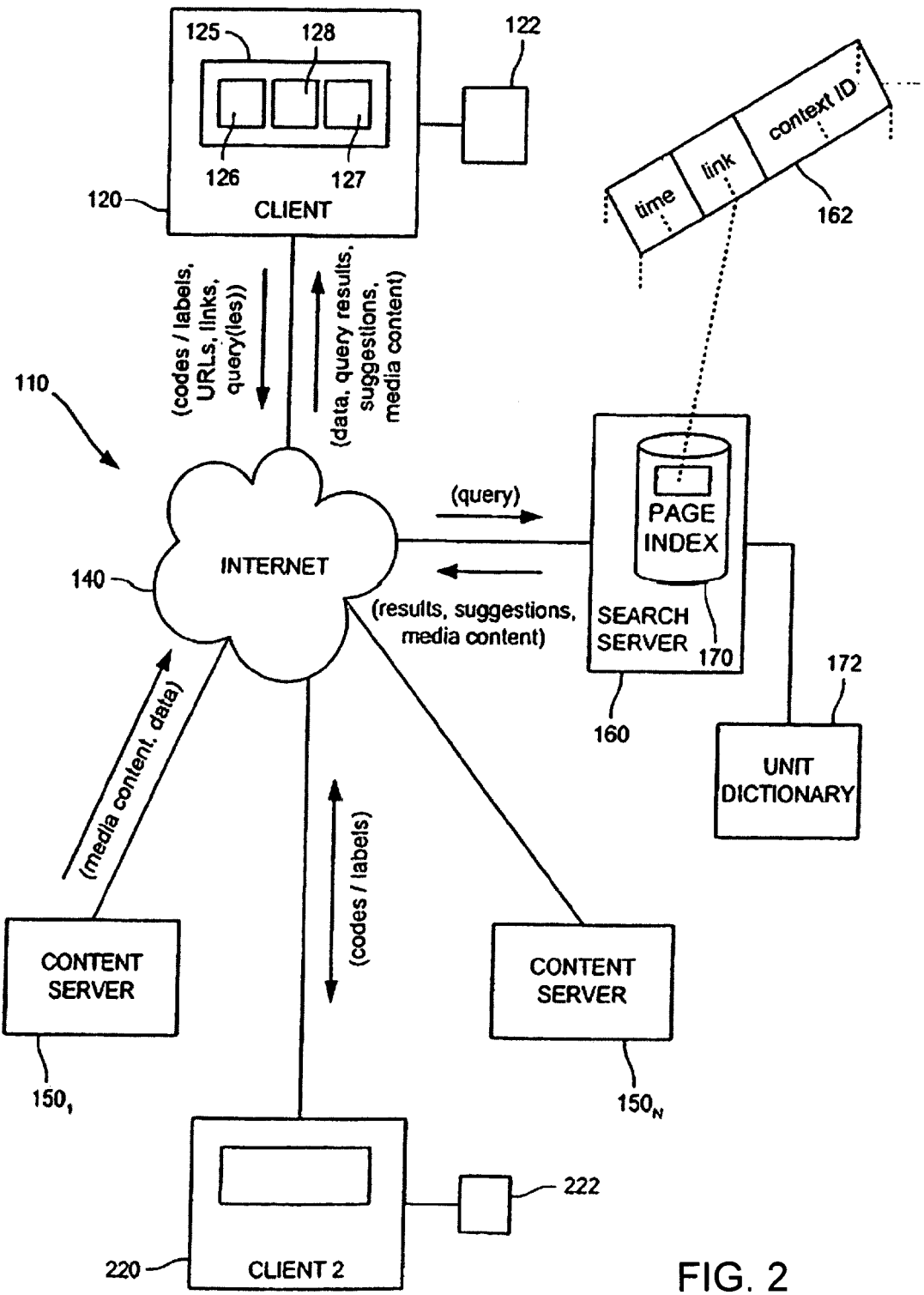
FIG. 2 is a block diagram of an information retrieval and communication network for communicating media content according to one embodiment of the present invention.

FIG. 2 illustrates another information retrieval and communication network 110 for communicating media content according to an embodiment of the invention. As shown, network 110 includes client system 120, one or more content server systems 150, and a search server system 160. In the network 110, client system 120 is communicably coupled through the Internet 140 or other communication network to server systems 150 and 160. As discussed above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of various applications executing on client system 120 for which application interface module 128 is preferably configured to interface with according to aspects of the present invention include various e-mail applications, instant messaging (IM) applications, browser applications, document management applications and others. Further, interface module 127 may include a browser, such as a default browser configured on client system 120 or a different browser. In some embodiments, client application module 125 provides features of a universal search interface as described in the above-referenced Provisional Application No. 60/460,222.

According to one embodiment, search server system 160 is configured to provide search result data and media content to client system 120, and content server system 150 is configured to provide data and media content such as web pages to client system 120, for example, in response to links selected in search result pages provided by search server system 160. In some embodiments, search server system 160 returns content as well as, or instead of, links and/or other references to content. Search server system 160 is also preferably configured to record user query activity in the form of query log files described below.

Search server system 160 in one embodiment references various page indexes 170 that are populated with, e.g., pages, links to pages, data representing the content of indexed pages, etc. Page indexes may be generated by various collection technologies including automatic web crawlers, spiders, etc., as well as manual or semi-automatic classification algorithms and interfaces for classifying and ranking web pages within a hierarchical structure. These technologies may be implemented on search server system 160 or in a separate system (not shown) that generates a page index 170 and makes it available to search server system 160.

An entry 162 in page index 170 includes, but is not limited to, a search term, a link (or other encoded identifier) to a page in which that term appears and a context identifier for the page. The context identifier may be used for grouping similar results for search terms that may have different meanings in different contexts. For example, the search term "java" may refer to the Java computer language, to the Indonesian island of Java, or to coffee (which is often colloquially referred to as java). The context identifier for a page advantageously indicates which of these contexts is applicable. A page link may be associated with multiple context identifiers, so the same page (or a link thereto) may be displayed in multiple contexts. Context identifiers are preferably automatically associated with page links by the system as users perform related searches; however, the identifiers may also be modified and associated with links manually by a team of one or more index editors. In this manner, knowledge gleaned from numerous searches may be fed back into the system to define and re-define contexts, making the displayed search results more valuable and useful to the requesting user.

Search server system 160 is configured to provide data responsive to various search requests received from a client system, such as from search module 126. For example, search server system 160 may be configured with search related algorithms for processing and ranking web pages relative to a given query (e.g., based on a combination of logical relevance, as measured by patterns of occurrence of the search terms in the query; context identifiers; page sponsorship; etc.). In accordance with embodiments of the present invention, these algorithms may include algorithms for concept analysis.

For instance, some embodiments of the present invention may analyze search queries, or search results in contexts for display at the user's computer 120. For example, in response to the search term "Java", some embodiments of search server system 160 return search results grouped into three (or more if other contexts are identified) contexts or word senses: Java the computer language, Java the island, and coffee java. The system may be configured to display the results in sets with links provided in association with each context, or the system may display just the contexts (with enough information to distinguish the contexts to the user) without any links and allow the user to select the desired context to display the associated links. In the Yahoo! network system, for example, a set of contexts might be displayed with each context having a set of links to pages from the search index, links associated with sponsored matches, links associated with directory matches and links associated with Inside Yahoo! (IY) matches.

In addition to words or phrases having ambiguous meanings, such as "Java", some embodiments of the present invention are configured to group results into contexts for search terms that are not necessarily ambiguous. One example is the result set returned for the search term "Hawaii". The term "Hawaii" in and of itself might not be ambiguous; however, the character of the results returned for such a term could be very broad, related to every site that discusses or mentions Hawaii. To provide more useful results to the user, the system of the present invention preferably organizes search results into contexts by leveraging knowledge of the contexts to which the results are actually related. For example, the term Hawaii, the system may return results in various context groupings such as "Hawaii: travel", "Hawaii: climate", "Hawaii: geography", "Hawaii: culture", etc. Such context identifiers ("travel," "climate," etc.) may be stored in page index entry 162 as described above.

It should be appreciated that the search system described herein is illustrative and that variations and modifications are possible. The content server and search server system may be part of a single organization, e.g., a distributed server system such as that provided to users by Yahoo! Inc., or they may be part of disparate organizations. A server system generally includes at least one server and an associated database system, and may include multiple servers and associated database systems, and although shown as a single block, may be geographically distributed. For example, servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" includes, but is not limited to, one or more logically and/or physically connected servers distributed locally or across one or more geographic locations; the terms "server" and "server system" are used interchangeably.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

In one embodiment, algorithms on search server system 160 perform concept analysis of search terms to provide more relevant results to the user. For example, for the search phrase "New York City" it is most likely that the user is interested in sites related to New York City (the city or region) as opposed to another city in the state of New York. Similarly, for "New York City law enforcement" it is most likely that the user is interested in sites related to law enforcement (e.g., segment of jobs) in New York City. Most conventional search engines, however, search using the individual terms "New", "York", "City", "law" and "enforcement," regardless of the order or context in which the terms appear in the search phrase. Other conventional search engines might try to find the longest substring in the search phrase that also appears in an index. For example, if the index contained "New York", "New York City" and "New York City law" but not "New York City law enforcement", the search engine would search using "New York City law" and "enforcement", which is not necessarily what the user intended and is unlikely to produce optimal results.

Search server system 160 may be advantageously configured to detect, in a query such as "New York City law enforcement," the concepts "New York City" and "law enforcement," returning results for these two concepts. In some embodiments, search server 160 uses the order that search terms are presented in a query to identify its constituent concepts. For example, using "New York City law enforcement" as the search phrase, the system may identify, e.g., by hashing, "New York City" and "law enforcement" as two concepts in the search phrase and returns results for these concepts. The same results may be returned for "law enforcement in New York City." However, for "city law enforcement in New York," different results may be returned based on the concepts "law enforcement" and "New York" and "city," or "city law enforcement" and "New York." Likewise, "enforcement of law in New York City" may be identified as including the concepts "New York City," "law" and "enforcement." Thus, according to some embodiments, the order of concepts is not so important as the order of terms that make up a concept. Concepts may be included in the page index (e.g., as terms and/or context identifiers) or a separate concept index may be implemented. It should be noted that "law enforcement" could be regarded as the same as "enforcement of law" or not depending on a given context. In some embodiments, the concepts within a query are advantageously detected by reference to a unit dictionary 172 that contains a list of known concepts (or "units").

Unit dictionary 172 is advantageously generated by a concept discovery process based on a given number (e.g., several hundred thousand) of previous queries. Concept discovery, examples of which are described below, involves analysis of the queries to generate a concept network and may be performed by search server 160 or by another server (not shown).

Figure 3:
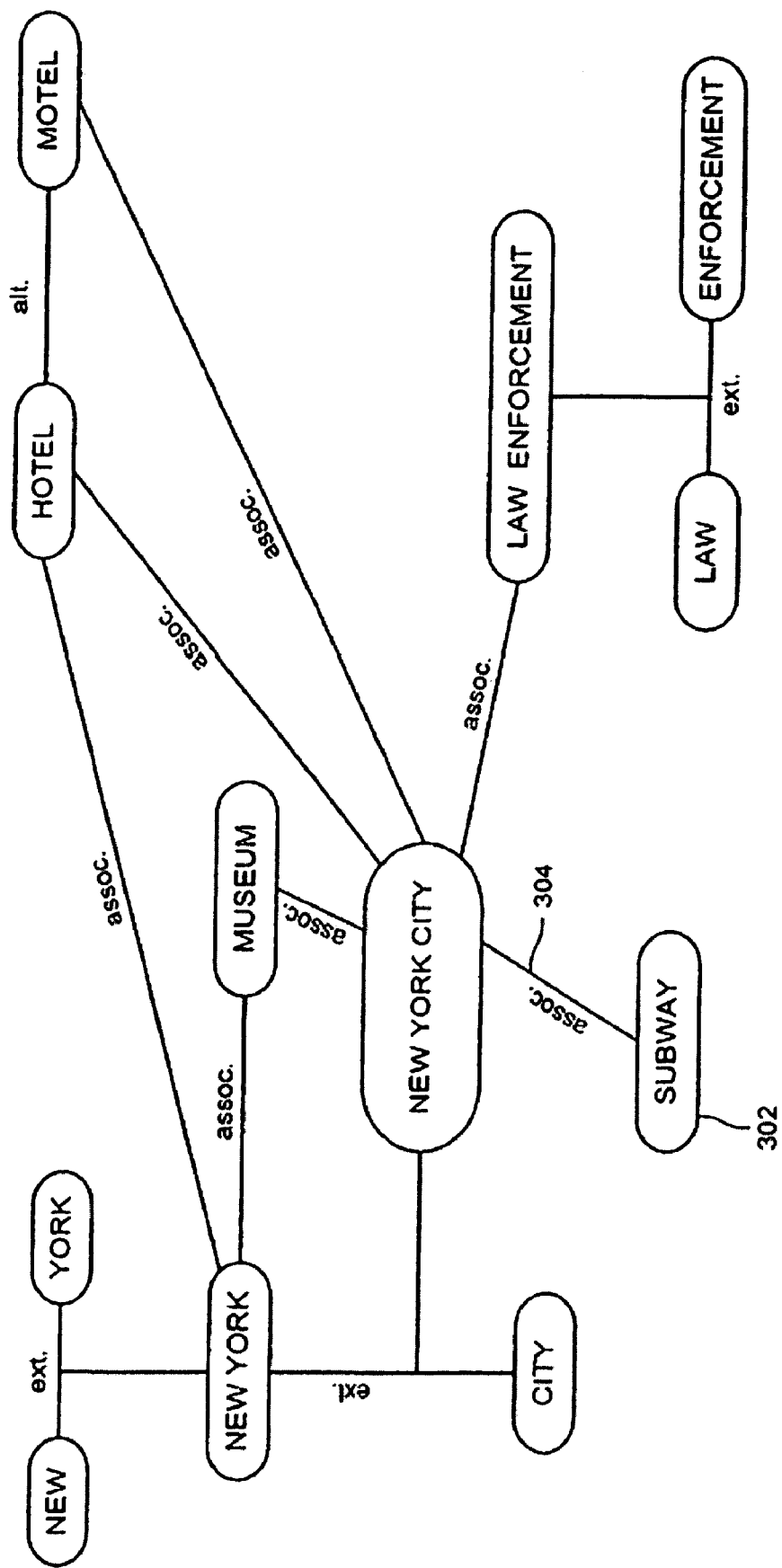
FIG. 3 is a graphical representation of a concept network according to one embodiment of the present invention.

As used herein, the term "concept network" encompasses any representation of relationships among concepts. For example, FIG. 3 is a graphical representation according to one embodiment of a concept network 300 for a number of concepts. Each concept or unit (e.g., "New", "York", "New York City", etc.) is a "node" (e.g., node 302) of the network and is connected to other nodes by "edges" (e.g., edge 304) that represent various relationships between concepts. A concept network can capture a variety of relationships. In the embodiment shown in FIG. 3, the relationships include extensions ("ext"), associations ("assoc"), and alternatives ("alt"); other relationships may also be captured in addition to or instead of those described herein.

According to one embodiment, "extension" as used herein is a relationship between two units that exists when the string obtained by concatenating the two units is also a unit. For example, the string obtained by concatenating units "new york" and "city" is "new york city," which is also a unit. The extension relationship is shown in FIG. 3 as a "T" junction, with the crossbar connecting the two units that are related by extension (e.g., "new york" and "city") and the stem connecting to the extension unit (e.g., "new york city").

According to one embodiment, an "association" as used herein is a relationship that exists between two units that appear in queries together. For example, FIG. 3 shows that unit "hotels" is an association of units "new york" and "new york city". According to one embodiment, pairs of associated units are also referred to herein as "neighbors," and the "neighborhood" of a unit is the set of its neighbors. To establish an association between units, a minimum frequency of co-occurrence may be required. It should be noted that the units that are related by association need not appear adjacent to each other in queries and that the string obtained by concatenating associated units need not be a unit. (If it is, then an extension relationship would exist. Thus, an extension relationship may be regarded as a special kind of an association.)

According to one embodiment, an "alternative" of a first unit is a different form (which may be a preferred, corrected, or other variant form) of the same expression; for example, FIG. 3 shows that "motel" and "hotel" are alternatives. Other examples of alternatives include "brittany spears" and "britney spears" (different spellings), or "belgian" and "belgium" (different parts of speech). Among a set of alternative units, one may be designated as "preferred," e.g., based on frequency of occurrence. For example, "britney spears" (the correct spelling of the name of the popular singer) might be a preferred alternative to misspelled alternatives such as "brittany spears." Embodiments described herein are case insensitive, and terms that differ only in capitalization (e.g., Belgium" and "belgium") refer to the same unit; other embodiments may distinguish units based on case and may identify units that differ only in capitalization as alternatives.

In some embodiments, the edges in the concept network may be assigned weights (not shown in FIG. 3), e.g., numerical values that represent the relative strength of different relationships. For example, the edge weight between a first unit and an associated unit may be based on the fraction of all queries containing the first unit that also contain the associated unit, or on the fraction of all queries containing either unit that also contain the other. Weights advantageously reflect relative strength; accordingly, weights may be normalized in any manner desired. It is to be understood that FIG. 3 is illustrative and that other relationships, as well as other representations of connections or relationships between different units or concepts might also be used; the term "concept network" as used herein encompasses alternative representations.

In some embodiments of the present invention, the relationships represented in the concept network also include membership of various units in clusters or superunits. According to one embodiment, the term "superunit" (or "cluster") as used herein refers to a set of units that have an identified common characteristic. The identified common characteristic (which may include multiple elements) may be represented by a "signature" of the superunit that may be used to determine whether another unit belongs in the superunit. In some embodiments, the signature is also used to determine a "membership weight" for each member unit based on a degree of similarity between the unit's characteristics and the signature characteristic(s). A threshold membership weight may be defined, and the superunit may include only units whose membership weight exceeds this threshold. A unit may be evaluated to determine whether it is a member of the superunit by comparing its associations to the signature. As with other relationships of units, superunit signatures and superunit membership information (e.g., membership weights) for various units may be stored in unit dictionary 172. Various aspects of superunits and clusters are described in above-referenced application Ser. No. 10/797,614.

Concept network 300 is advantageously generated from a set of user queries collected over some time period (e.g., a day, a week, multiple weeks, etc.) and may be regenerated from time to time based on different sets of user queries. Thus, concept network 300 can evolve naturally to reflect changing user interests and behavior. Embodiments of the present invention advantageously provide additional features that support analysis of the evolution of concept network 300 and use of such analysis in responding to subsequent user queries, e.g., by detecting or predicting patterns of user interest in particular concepts.

Search server 160 may advantageously use concept network information in responding to queries, e.g., by parsing a query into units, identifying relationships of query units to other units in one or more concept networks, and using that information to determine what the user most likely intended. Search server 160 may use this information about likely user intent, e.g., to organize the search results, suggest related searches, etc. These features of the search server 160 are described greater detail herein.

In some embodiments, search server 160 also makes use of an ability to categorize queries in one or more hierarchies (taxonomies) defined along one or more dimensions. If pages are also categorized using similar taxonomies, category information can also be used, e.g., in combination with concept network information, to infer user intent and tailor a response. Such features are described in above-referenced Provisional application Ser. No. 11/006,463 and Provisional application Ser. No. 11/006,466.

Figure 4:
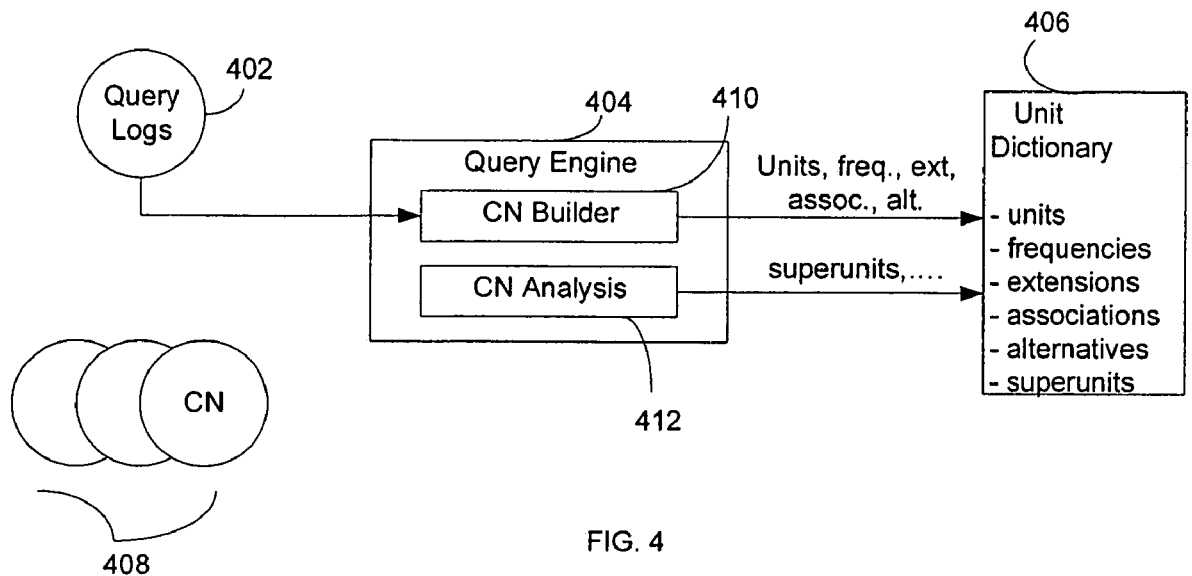
FIG. 4 is a block diagram of a system for performing concept analysis according to one embodiment of the present invention.

FIG. 4 is a block diagram of a system 400 for performing concept discovery or concept analysis according to one embodiment of the present invention. One or more query log files 402 (or actual queries) are received by a query processing engine (also referred to as a query engine) 404, which generates a unit dictionary 406. Query engine 404 may be a component of search server system or a different system that communicates with search server system. In one embodiment, query engine 404 includes a concept network (CN) builder module 410 and a CN analysis module 412. CN builder module 410 analyzes the content of query log file 402 and generates one or more concept networks 408 that include units, relationships between units (e.g., extensions, associations, and alternatives), and edge weights for the relationships. Information about the units and their relationships is advantageously captured in a unit dictionary 406 that can be used during processing of subsequent queries. CN analysis module 412 receives concept networks 408 and performs further analysis on these concept networks, which may include merging of multiple concept networks. In some embodiments, CN analysis module 412 may update unit dictionary 406 with additional information about units and relationships.

Unit dictionary 406 may be implemented in any format and stored on any suitable storage media, including magnetic disk or tape, optical storage media such as compact disk (CD), and so on. The content of unit dictionary 406 may advantageously include the units, as well as additional information about each unit, such as relationships (e.g., extensions, associations, alternatives) and statistical data (e.g., edge weights) generated by CN builder module 410 and/or CN analysis module 412. Information stored in unit dictionary 406 can be used by a search server (e.g., search server 160 of FIG. 2) to respond to subsequent queries. It is to be understood that any or all of the information from one or more concept networks 408 can be included in unit dictionary 406, and in portions of the present description, the terms "concept network" and "unit dictionary" are used interchangeably.

A query log file 402 (or an actual query) may be received from various sources over the Internet or through various network connections, e.g., LAN, WAN, direct links, distribution media (e.g., CD, DVD, floppy disk). Examples of sources include a search server system, or multiple search servers in a distributed network of search servers, and one or more of content servers. Query log file sources are typically associated with the same organization or entity, e.g., Yahoo! servers, but need not be. The query log files (also referred to as query logs) are processed by query engine 404 using statistical methods such as may be used in information theory or concepts such as mutual information. In some embodiments, daily query logs are used, although logs for different time periods, e.g., hours, weeks, etc. may be used as desired. Query logs typically include actual queries (e.g., text strings) submitted by users and may also include additional information (referred to herein as "meta-information") for some or all of the queries, such as geographic location of querying users, timestamps, IP addresses of client systems, cookies, type of client (e.g., browser type), etc. For example, query log entries might be formatted as <query_string, meta-information> or as <count, query_string> where "count" represents frequency of occurrence. (Frequency may be normalized or not as desired.)

The CN builder 410 processes the query logs 402 to generate concept network 408. According to some embodiments, CN builder 410 uses the order of search terms within a query to identify one or more units that make up that query. For example, a unit may be a word (e.g., "java") or a group of words that frequently appear adjacent to each other (e.g., "new york city"). The units correspond to nodes (concepts) in the (concept network.

CN builder 410 may also analyze the units to detect relationships such as extensions (which may be detected based on one word or unit sometimes being followed by another word or unit and sometimes not), associations (which may be detected based on frequency of occurrence of pairs of units), and alternatives (which may be detected based on "edit distance," i.e., the number of typographical changes required to transform one unit into another). Particular techniques for identification of units and relationships between units (including associations, extensions, and alternatives) are described in detail in above-referenced and previously incorporated application Ser. No. 10/713,576. It should be appreciated that CN builder 410 may also implemented according to other techniques in addition to or instead of those described therein, in order to generate concept network 408.

A representation of concept network 408 may be stored in unit dictionary 406. In some embodiments, this representation includes the units together with sets of relationships and weights for each unit. Various data compression techniques may be used for representing this information in unit dictionary 406.

In a preferred embodiment of the present invention, CN builder 410 generates multiple concept networks 408 from different subsets of the query logs 402. These subsets might or might not overlap. For instance, a new concept network covering the most recent four weeks might be generated each week, with a given query being included in the inputs to four different concept networks. In another embodiment, a separate concept network could be generated for each week's queries, with a given query being included in the inputs to only one concept network.

The query logs may be partitioned, or "binned," for generating different concept networks in any manner desired. For example, a week's worth of queries could be binned into 24 "hourly" bins; a month's (or several months') worth of queries could be binned according to day of the week, weekday vs. weekend day, and so on. In some instances, one query may be placed into multiple bins, and different time breakdowns may be implemented in parallel. Thus, by way of example, there might be one bin for "last 24 hours," another bin for "last week," a third bin for "last four Mondays," and a fourth bin for "last month mornings." A query received at 8 a.m. on the most recent Monday might be present in all four of these bins.

Binning of queries in dimensions other than time is also possible. For example, queries may also be binned in geographic dimensions, user demographic dimensions, and "vertical" dimensions. Binning by geography can be based, e.g., on user location, which can be determined from the user's IP address, Zip code, or similar meta-information provided in the query log, and/or which of a number of different international or regional search servers the user accessed when entering the query (server identity may be included in the meta-information for each query or determined based on the source of a particular query log file). Binning in user demographic dimensions can be based on any known characteristic of the user, e.g., age, sex, membership in various online forums, etc. Such information may be included in the meta-information of some or all of the queries, or it may be determined based on other meta-information of the query; e.g., for queries entered by registered users, the meta-information may include a username that can be used to access a database that stores demographic information for registered users. The "vertical" dimension as used herein refers generally to aspects of the user's location in cyberspace at the time of submitting a particular query. For instance, a search server site may offer its search interface through various "properties" (e.g., news, financial, sports, shopping, etc.) that are distinguished by different server identifiers and/or URLs. Queries submitted at different ones of these properties may be separated for analysis; Other binning techniques. e.g., as described in above-referenced application Ser. No. 10/712,307 and application Ser. No. 10/797,586, may also be used in embodiments of the present invention.

Figure 5:
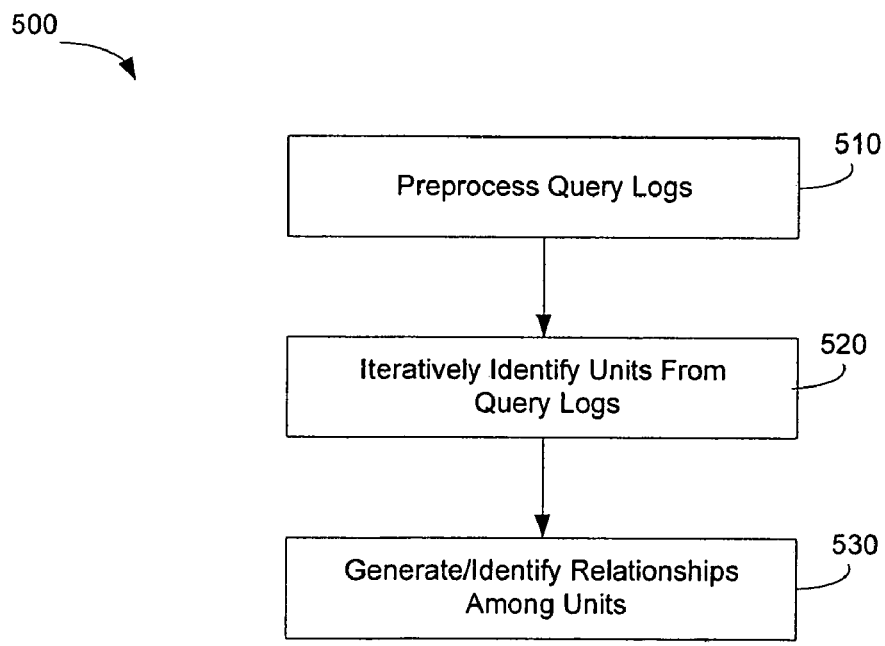
FIG. 5 is a flow diagram of a process for building a concept network according to one embodiment of the present invention.

FIG. 5 is a high-level flow diagram of a process 500 for building a concept network that may be implemented by the CN builder. At step 510, query log files are preprocessed to generate query data in a convenient form. For example, queries may be canonicalized, e.g., by removing suffixes, prefixes, plural designations, stop words (e.g., "the", "and"), and odd symbols. To reduce the total number of queries, duplicate queries in the log file can be detected and removed. A frequency counter can be associated with each query and set to a value indicating the number of times a given query occurred so that information about frequency of queries is not lost. The queries can also be tokenized (e.g., by identifying individual words of the query based on such indicators as spaces and hyphens), and hash encoding or other similar operations may be used to represent the tokens.

At step 520, units are identified by an iterative process. For example, as described in detail in above-referenced application Ser. No. 10/713,576, the set of all distinct tokens found in the queries can be used as an initial set of units, and additional candidate units can be identified by considering units that appear next to each other in queries. Such pairs of units, if they occur together often enough, can become units themselves. This process repeats until the set of units satisfies a convergence criterion. In addition, a frequency cutoff may be applied to units, e.g., in one embodiment, a candidate unit (including single tokens) that does not occur at least a minimum number of times over the whole set of queries is eliminated from the set of units. In general, processing time required to generate the final set of units by an iterative analysis scales according to the total number of distinct queries in the input query log(s).

At step 530, after the set of units has converged, relationships among the units are generated. For example, associations, extensions, and alternatives may be identified and assigned relationship weights. These relationships may be identified, e.g., by counting instances of co-occurrence of various terms in queries and applying suitable thresholds on the number of such instances, without iterating over the input query data. Specific examples are described in above-referenced application Ser. No. 10/713,576. Superunits, clusters, or other groupings of conceptually similar units may also be generated at this stage by various processes that might or might not involve iterative processing of the concept network but advantageously do not directly use the query data. Examples of such processes are described in above-referenced application Ser. No. 10/797,614; other processes may also be used. It should be noted that processes for generating relationships among units generally scale according to the number of units in the concept network rather than with the number of queries.

It should be appreciated that the process described herein is illustrative and that variations and modifications are possible. Steps described as sequential may be executed in parallel, order of steps may be varied, and steps may be modified or combined. One implementation of process 500 is described in above-referenced application Ser. No. 10/713,576; it is to be understood that other implementations are also possible.

In one embodiment, process 500 is performed at regular intervals to process queries collected over a given time period (e.g., weekly). A large search provider might collect, e.g., 250 million or more queries in a week, with about half of those queries being distinct from each other. Processing this large set of queries to generate a concept network may demand significant computational resources.

In some embodiments, it is desirable to generate concept networks reflecting user behavior over longer time periods (e.g., a month, six months, or a year). Those skilled in the art recognize that, for a given computer system, an iterative process for generating a set of units from a set of queries (e.g., process 500) requires more time as the size of the query set grows, in part because each iteration over the queries takes more time. Thus, there is always some maximum number of givens for which executing process 500 to generate a concept network is practical. The exact maximum, of course, is highly dependent on the resources available for executing process 500.

Figure 6:
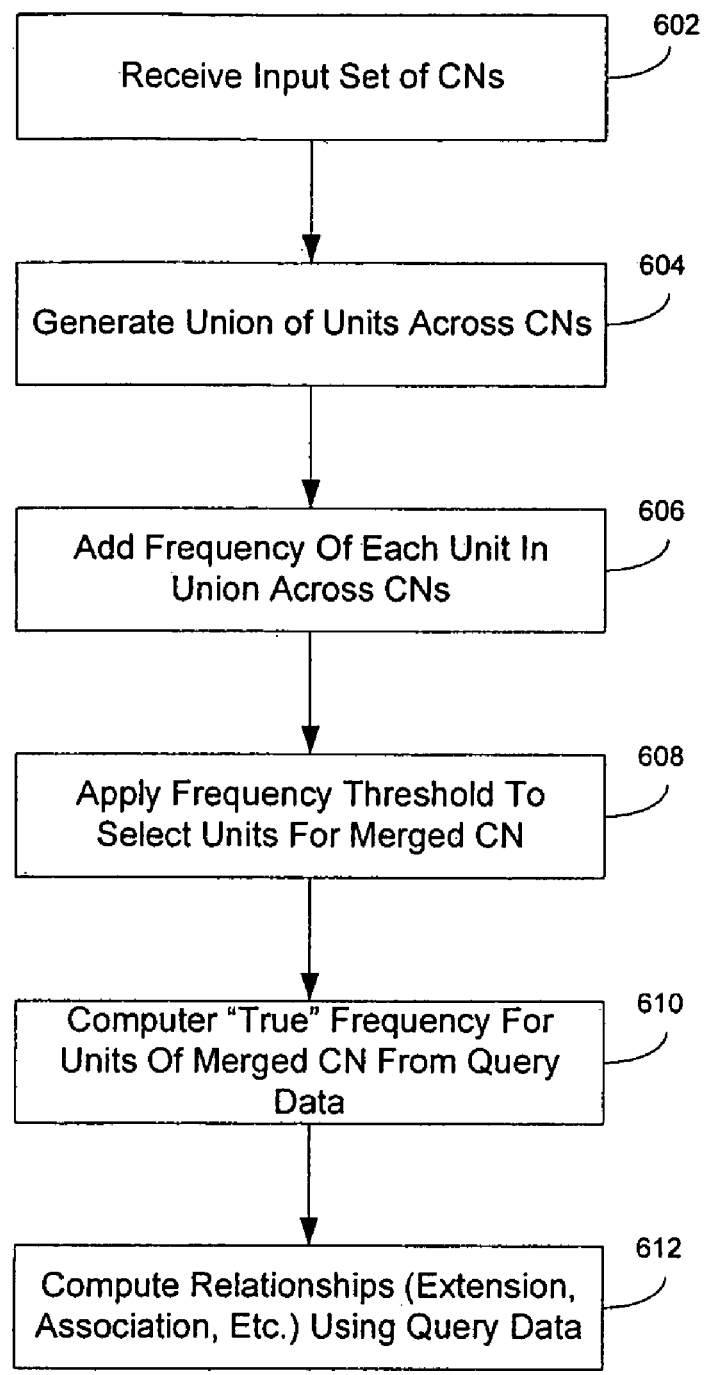
FIG. 6 is a flow diagram of a process for merging a number of concept networks according to an embodiment of the present invention.

Accordingly, one embodiment of the present invention provides a method for generating a concept network from a large number of queries by generating a different concept for each of some number of non-overlapping subsets of the queries, then merging the concept networks. FIG. 6 is a flow diagram illustrating one embodiment of a process 600 for merging some number (N) of concept networks. Process 600 eliminates the iterative unit-identification step 520 of process 500, thereby considerably speeding the process and reducing the storage requirement.

At step 602, an input set of concept networks is received. For example, if it is desired to generate a concept network covering a four-week period, the input concept networks might be four concept networks that were generated (e.g., using process 500 described above) for queries received during four consecutive weeks. Each concept network ($CN_1$) includes some set of units $u_{ji}$, where each unit has a frequency $f_i(u_{ji})$. In the example described herein, the frequency is an integer representing the number of times the unit occurred in the queries used to generate that concept network; any other representation of relative frequency of occurrence for different units may be substituted. In general, due to variations in the queries used to generate the different concept networks, different concept networks do not necessarily include all of the same units, and where two concept networks $CN_1$ and $CN_2$ do include the same unit, the frequencies $f_1(u_{j1})$ and $f_2(u_{j2})$ might be different.

Process 600 selects units for the merged concept network based on units of the input concept networks. Specifically, at step 604, a union set U of the units across all of the input concept networks is created; any unit $u_{ji}$ that appears in at least one of the input concept networks is included in union set U. At step 606, an aggregate frequency $A(u_j)$ is computed for each unit in set U, where:

$$A(u_j) = \sum_i f_i(u_{ji}) \qquad \text{(Eq. 1)}$$

If a unit $u_j$ does not occur in one of the concept networks i, it is assumed that $f_i(u_{ji})=0$ for that unit.

At step 608, units for the merged concept network are selected by applying a threshold to the aggregate frequencies $A(u_j)$. The threshold may be selected in various ways. In one embodiment, the frequency threshold is selected based on a threshold that was used to identify units in the input concept networks. For example, in one embodiment, the input concept networks are generated using an algorithm that discards any candidate unit that does not occur more than once per day. Accordingly, for the merged concept network a threshold corresponding to an average of just over one query per day can be used. For example, if each input concept network covers one week (seven days), and N such concept networks are being merged, the total time period is 7N days, and the frequency threshold may be set to 7N+1 (or just to 7N). Other threshold values may also be selected. The units whose aggregate frequencies exceed this threshold become the units of the merged concept network.

At step 610, a "true" frequency $F(u_j)$ is computed for units in the merged concept network by returning to the query data for each of the input concept networks and determining the number of occurrences of each unit. For units that were included in all of the input concept networks, the true frequency may generally be the same as the aggregate frequency computed at step 606. For units that were included in fewer than all of the input concept networks, the true frequency may be higher than the aggregate frequency. As an example, one embodiment of a process for forming the input concept networks might impose a minimum frequency of occurrences, e.g., exact occurrences. A unit ($u_m$) of the merged concept network that occurred six times in the query set for one input concept network would not be a unit in that network, and the six occurrences would not contribute to $A(u_m)$ but would contribute to the true frequency $F(u_m)$.

At step 612, relationships such as associations, extensions, and alternatives are computed using the query data for the input concept networks. Additional relationships or groupings, such as superunits, clusters, and so on may also be computed, e.g., as described in above-referenced application Ser. No. 10/797,614, using the merged concept network as the input. It should be noted that the time required for such processing scales with the number of units rather than the number of queries, and in many applications, the number of units increases more slowly over time than the number of queries.

It should be appreciated that the process described herein is illustrative and that variations and modifications are possible. Steps described as sequential may be executed in parallel, order of steps may be varied, and steps may be modified or combined. The frequency parameter may take various forms, and the threshold for selecting units for the merged concept network may be varied. It should be noted that processing time for unit-generating step 608 generally scales with the total number of units rather than the total number of queries and that step 608 eliminates the need for iteratively processing the queries to generate units, which would scale with the (generally larger) total number of queries. Thus, for a sufficiently large query file, an efficiency gain can be realized by splitting up the queries and generating smaller concept networks, then merging concept networks according to process 600. Those skilled in the art recognize that the determination of when a query file is large enough that processing it in subsets is advantageous depends on various factors, including the available computing resources, the amount of duplication of queries and of words or phrases within the queries, and so on.

Merging of concept networks may also be performed in other circumstances. For example, concept networks generated for different vertical domains may be merged to create a global picture of user behavior.

Once concept networks are generated, they may be analyzed in various ways to detect patterns of user behavior. Such patterns may be used to inform query responses, as is described in greater detail herein. Some examples of analyses that may be performed on a set of concept networks are now described.

One analysis involves comparing the most popular (e.g., most frequently occurring) units of one concept network to the most popular queries used to generate another concept network. For example, suppose that a set Q1 of queries was used to generate a concept network CN1 having units $u_{ji}$ and that a different set Q2 of queries was used to generate a concept network CN2 having units $u_{j2}$. An "overlap" parameter $\eta_{12}$ be defined by selecting the M most frequent queries from set Q2 (where M is, e.g., 100 or 1000) and determining the frequency of these queries as units $U_{j2}$ in CN2. In one formulation:

$$\eta_{12} = \sum_{k=1}^{M} [u_{k1}/u_{k1} = Q_k] * (Q_k \text{ in } Q2]. \quad (\text{Eq. 2})$$

where $Q_k$ (for k=1 to M) is the kth most frequent query in the input query set for concept network CN2, $f(u_{k1}/u_{k1},=Q_k)$ denotes the frequency of the string $Q_k$ as a unit $(u_{k1})$ in concept network CN1, and $f(Q_k \text{ in } Q2)$ denotes the frequency of the query $Q_k$ in the input query set Q2 for the other concept network C2. It should be noted that because query frequency is used for one factor while unit frequency is used for the other factor, in general $\eta_{12} = \eta_{21}$ In general, $\eta_{12}$ tends to be largest for pairs of concept networks (or query sets) where frequently occurring units of one concept network correspond to the most frequent query strings of the other. To facilitate comparison of overlap parameters across different concept networks, the frequencies for queries and units used in Eq. 2 may be normalized in some manner if desired.

Other formulations of the overlap parameter are also possible, and any parameter that quantifies the degree of overlap between units of one concept network and frequently occurring queries of another may be used. High overlap indicates a coincidence of interests between the users who entered the queries in the two sets QI and Q2. For instance, if the sets QI and Q2 correspond to searches entered at two different properties (e.g., news and travel), the overlap parameter may indicate the likelihood that a user searching in the first property would be interested in results from the second property as well.

Figure 7:
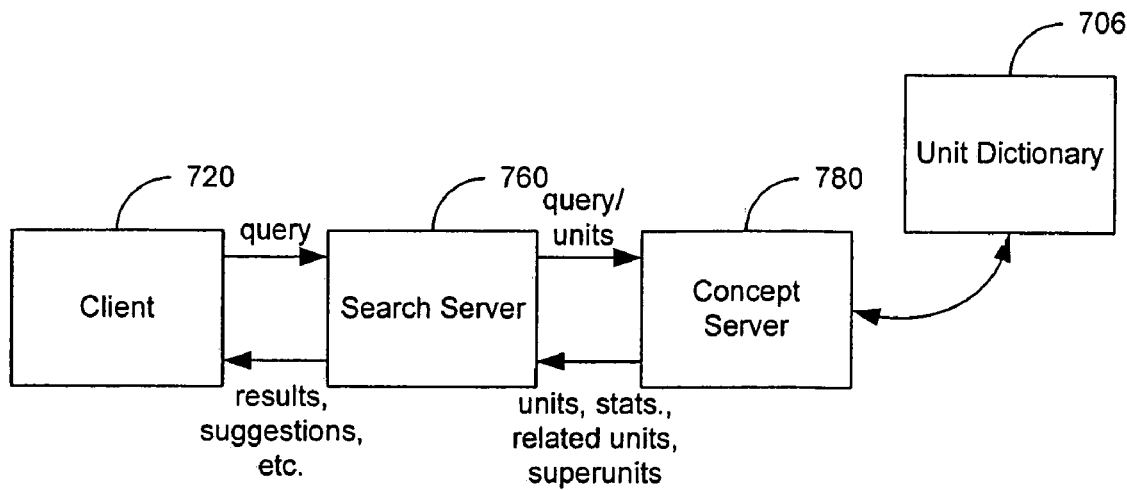
FIG. 7 is a block diagram illustrating a system for query processing according to one embodiment of the present invention.

Concept network information may be used in various ways to enhance a response to 30 a query. FIG. 7 illustrates one embodiment of a methodology that can be used by system of the present invention to respond to a query. Client 720 transmits a query to search server system 760. Search server system 760 sends the query and/or its constituent units to a concept server 780, which accesses unit dictionary 706. Concept server 780 returns conceptual data related to the query, such as one or more units identified from the query along with statistics and superunit information for the various units. This information may be derived, e.g., by hashing the query to identify units contained therein and accessing unit dictionary 706 to retrieve entries for identified units. In this embodiment, unit dictionary 706 includes any information about the units that are to be made available during query processing and may include a representation of a concept network in full or in part. In one embodiment, the returned information includes information about superunit(s) associated with the query or individual units thereof.

Search server system 760 advantageously uses the conceptual data received from concept server 780 in responding to the query. The results returned by search server system 760 may advantageously include results responsive to the user's query along with other related information, such as hints and tips about what the user might want to explore next based on understanding of user needs as captured in units and their relationships. Such understanding can be obtained, e.g., by using the concept network analysis techniques described above or other related techniques described in above-referenced application Ser. No. 10/712,203, application Ser. No. 10/713,576, application Ser. No. 10/797,586, application Ser. No. 10/797,614, application Ser. No. 10/818,752, Provisional application Ser. No. 11/006,463, and Provisional application Ser. No. 11/006,466.

Several examples of ways in which concept network information from one or more concept networks can be used to respond to a query are now be described. It is to be understood that these examples are illustrative and not restrictive.

As described in related application Ser. No. 10/713,576, one use for concept network information is to provide suggestions to the user for related searches based on a query entered by the user. In general, suggestions reflect inferences about other things in which a user who enters a particular query might be interested in.

For example, when a query is received, concept server 780 may parse the query into units, then obtain extensions, associations and/or alternatives for one or more of the units from unit dictionary 706. Concept server 780 may use this information to generate suggested queries (also referred to herein as "suggestions"), which may include the original unit and/or one or more of its related units (e.g., extensions, associations and/or alternatives). The suggestions can be filtered, e.g., to remove suggestions that contain significantly more words than the original query, suggestions where the units refer to something illegal, suggestions that introduce known spelling errors, and so on. Suggestions may also be canonicalized (e.g., to remove duplicative suggestions, eliminate spelling errors, etc) and sorted based on a rating representing the likelihood of an inference that the user will be interested. Such a rating may be, e.g., computed from relationship weights between units in the suggestion and units in the original query. Examples of techniques that can be used for generating lists of suggestions from concept network data are described in related application Ser. No. 10/713,576.

Figure 8:
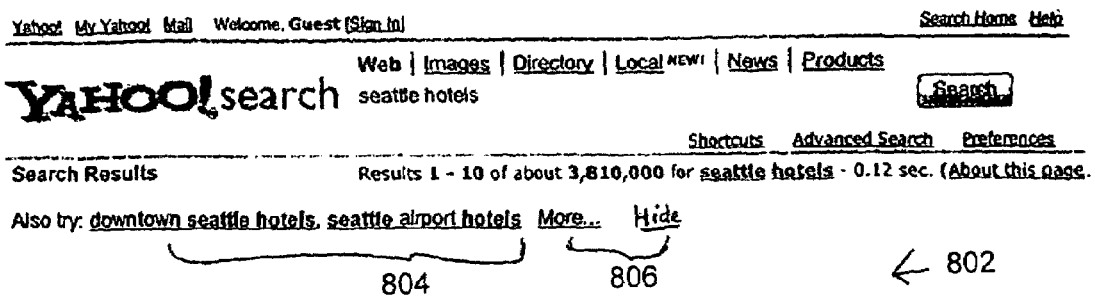
FIG. 8 is an exemplary search results page including suggestions for related searches according to one embodiment of the present invention.

Ultimately, concept server 780 returns a list of suggestions. Search server 760 receives the suggestions and presents them to the user. FIG. 8 illustrates one embodiment of an exemplary search results page 802 including suggestions 804 for related searches that might be generated for the query "seattle hotels." In one embodiment, a given number of suggestions 804 are included in the initial search results page presented to the user. In another embodiment, the initial search results page includes a control element (e.g., a button) that the user may select to cause suggestions 804 to be displayed as shown in FIG. 8. Additional control elements 806 may be provided for hiding the suggestions, displaying additional suggestions, and so on.

Returning to FIG. 7, the unit dictionary 706 may evolve over time. For example, a new concept network may be generated periodically, e.g., each week. As user interests and behavior change, the set units and the related units for a given unit (as well as associated statistics such as relationship weights) will change. In some cases (e.g., for queries with low frequency), the unit dictionary 706 might not provide enough related units for a particular unit to generate a satisfactory set of suggestions. One option in such cases is to expand the time range covered by the unit dictionary. This may be accomplished by accessing merged concept networks covering several weeks. Actual merging of concept networks is advantageously performed in advance of receiving a query for which access to the merged network is desired, and the results can be stored.

Figure 9:
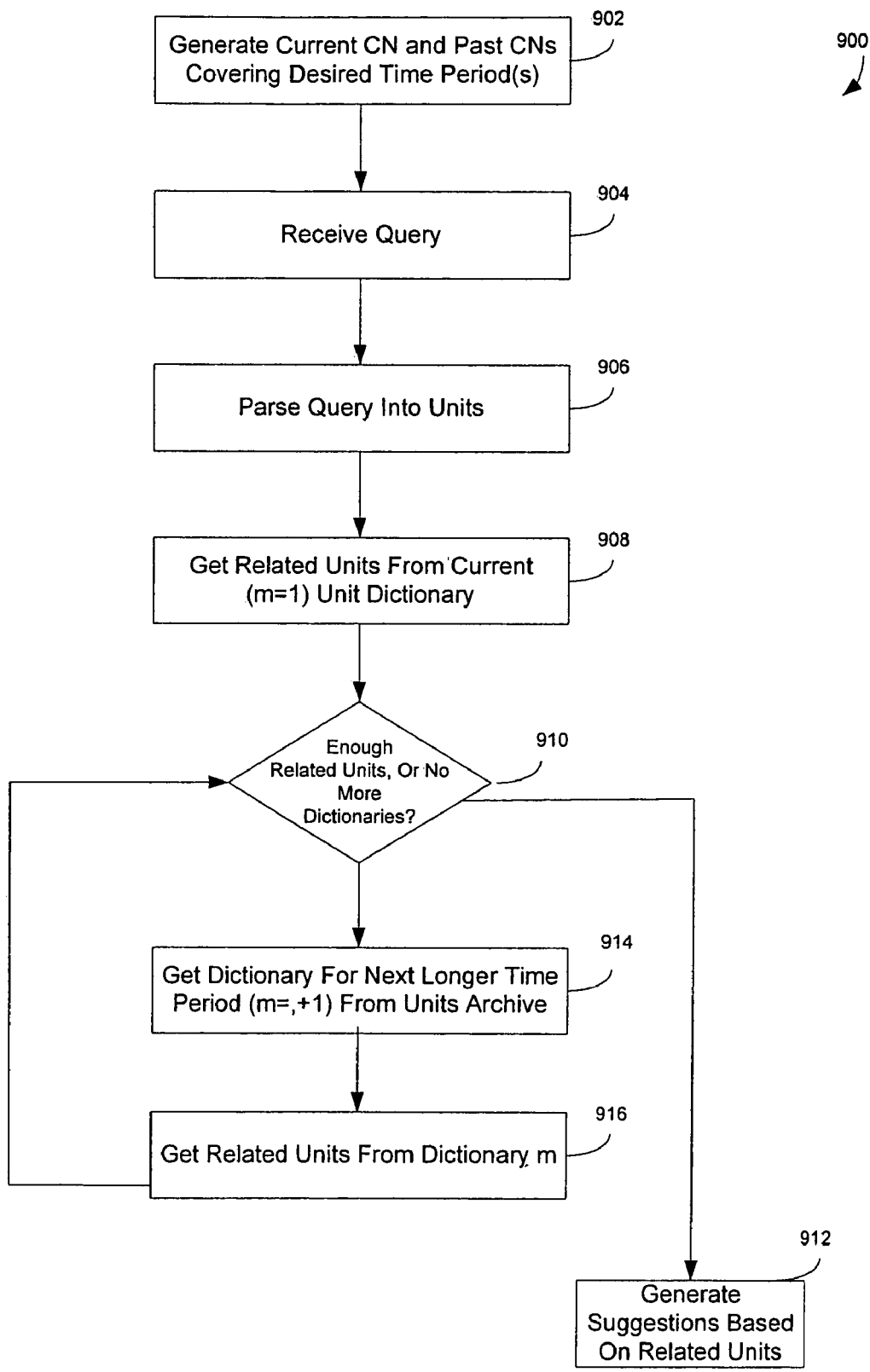
FIG. 9 is a flow diagram of a process for generating suggestions with the use of merged concept networks according to one embodiment of the present invention.

One embodiment of a process for generating suggestions with the use of merged concept networks is shown in FIG. 9.

Prior to query processing, a current concept network $CN_1$ is created, as are a set of past concept networks $CN_2$ to $CN_N$ (for some integer N) covering a range of time periods into the past is created step 902. It is to be understood that a concept network $CN_m$ may include the time period covered by concept network $CN_{m-1}$ plus an additional, earlier time period. For example, if the current concept network $CN_1$ is based on queries received in the most recent week, $CN_2$ might be based on queries received in the last two weeks, $CN_3$ on queries received in the last three weeks, and in general $CN_m$ on queries received in the last m weeks.

Figure 10:
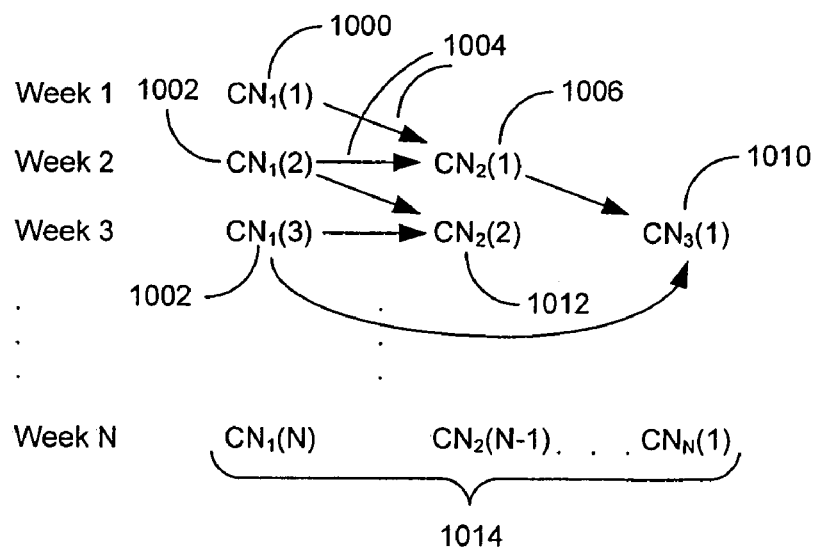
FIG. 10 illustrates a family of merged concept networks according to one embodiment of the present invention.

In one embodiment of a concept network, illustrated in FIG. 10, a concept network $CN_1(1)$ 1000 might be generated from a week's query logs. A week later, a second $CN_1(2)$ 1002 might be generated from the second week's queries, and $CN_1(2)$ 1002 would be merged with $CN_1(1)$ 1000, as indicated by the arrow 1004, to create a $CN_2(1)$ 1006. Merging of concept networks may be done as described above. Another week later, a third $CN_1(3)$ 1001 might be generated from the third week's query logs and merged with $CN_2(1)$ 1006 to create a $CN_3(1)$ 1010 and also merged with the $CN_1(2)$ 1002 to create a new $CN_2(2)$ 1012. The previous week's set of concept networks can be discarded or archived as desired.

It should be appreciated that this procedure may continue so that, over N weeks, a library of N concept networks $CN_1$ to $CN_N$ might be built up. After N has reached a desired maximum value, in week N+1, concept network $CN_N(1)$ might simply be discarded rather than being merged with concept network $CN_1(N+1)$, thus keeping the total number of concept networks in the library limited to N.

Referring again to FIG. 9, after the library of concept networks has been generated, a query is received and parsed into units, steps 904 and 906. At step 908, related units for generating suggestions are obtained based on concept network $CN_1$. At step 910, it is determined whether enough related units have been obtained to perform suggestion generation. In one embodiment, a minimum of 100 related units are desirable; other thresholds (e.g., 20 or 50) may also be used. In addition, related units may be counted only if their frequency weight exceeds some threshold (e.g., 5, 20, 50 or 100 occurrences). If enough related units were obtained, generation of suggestions (e.g., as described above) is performed at step 912.

If, at step 910, not enough related units were found, then an iterative procedure is used to obtain more related units by searching concept networks covering increasingly longer time periods. Specifically at step 914, the next concept network in the sequence is retrieved from the library. In the first pass, the next concept network would be $CN_2$; more generally, if $CN_m$ was previously used, $CN_{m+1}$ would be retrieved on the next iteration. At step 916, related units are obtained from the retrieved $CN_{m+1}$. The process then returns to step 910 to determine whether enough related units have been found in this dictionary. If not, steps 914, 916 and 910 are repeated, extending the search incrementally farther back in time, until enough related units are found or until all $CN_m$ have been consulted.

It should be noted that in general, $CN_{m+i}$ is based on a superset of the queries used to generate $CN_m$. Thus, $CN_{m+1}$ may typically provide at least as many related units as $CN_m$. For appropriate choices of the maximum number of weeks (N) and the minimum number of related units at step 910, a large fraction of queries will yield enough related units.

Alternatively or in conjunction with the foregoing, one could simply use a single concept network covering an N-week period for all queries. Those skilled in the art should appreciate that an iterative process such as that of FIG. 9, where the time frame is gradually expanded, provides advantages by only going back in time as far as necessary for a given query. In the case of a popular query subject, it may not be necessary to go very far back to obtain enough related units, and limiting the related units to those determined from recent queries makes it more likely that any recent shifts in user interest would be reflected in the suggestions. At the same time, because it is possible to go farther back, useful suggestions may also be generated in situations where relatively few users have entered queries related to the current query.

It should also be appreciated that the process of FIG. 9 is illustrative and that variations and modifications are possible. Steps described as sequential may be executed in parallel, order of steps may be varied, and steps may be modified or combined. The various concept networks in the library may be provided as unit dictionaries, and the time interval defining the different concept networks may be different from the one-week intervals used herein; e.g., a day or a month might be used. In still other embodiments, the different concept networks in the library might cover unequal intervals, e.g., the library might include "last week," "last two weeks," "last month," and "last two months." In another variation, the different concept networks in the library could cover discrete, rather than overlapping, time periods, and the related units obtained in the iterative process could be accumulated as they are retrieved.

It is well documented that conventional search engines often fail to return enough relevant content to satisfy the user who entered the query. Often the problem is that the user's query does not provide enough context to enable the search engine to distinguish content that is truly relevant to what the user is seeking. When this happens, users might try rephrasing the query once or twice, but soon they usually give up.

Figure 11:
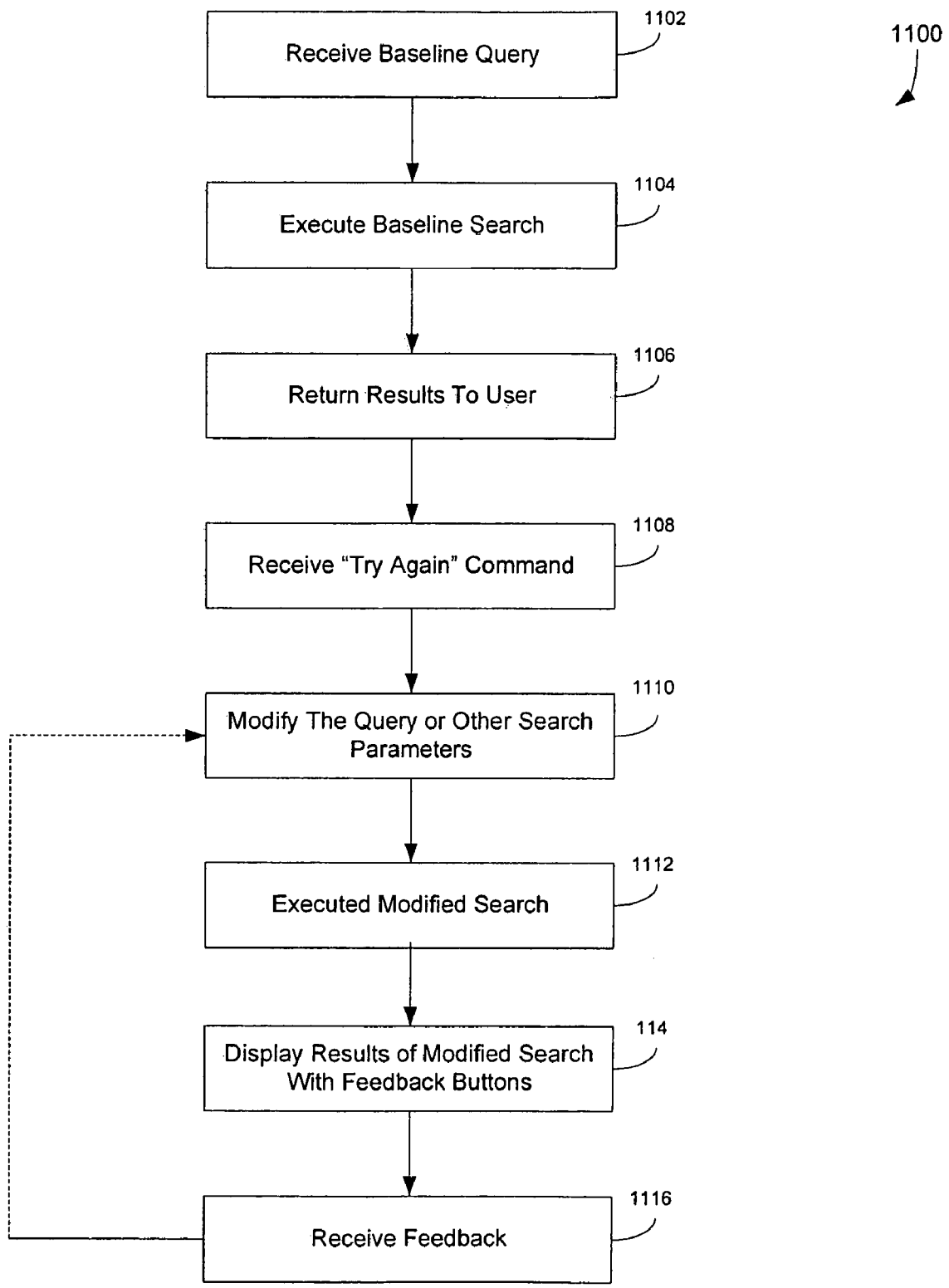
FIG. 11 is a flow diagram of an assisted search process according to one embodiment of the present invention.

To help a user frame a more effective query, some embodiments of the present invention provide an interactive "assisted search" module. A high-level flow diagram for one embodiment on an implementation of an assisted search module is shown as process 1100 in FIG. 11. A baseline query is received from a user, step 1102, a search is executed for that query, step 1104, and a results page (or other display) is provided to the user, step 1106. The results page advantageously includes a "Try again" button that the user can click to invoke assisted search features. In response to a "Try again" command from the user, step 1108, the assisted search module modifies the query or other search parameters in some way, step 1110, executes the modified search, step 1112, and displays a new results page, step 1114. The new results page advantageously includes feedback buttons that the user can select to provide positive or negative feedback, step 1116. In response to the feedback, the assisted search module may modify the query again, returning to step 1110 for further iterations if the user so desires.

When process 1100 returns to step 1110, the further modification may advantageously selected based at least in part on the feedback. In one embodiment, the feedback buttons include "Better," "Worse" and "Try again" buttons. The "Better" button indicates that the modified search returned more relevant content than the previous search, the "Worse" button indicates the opposite, and the "Try again" button indicates that the modified search did not do appreciably better or worse (but still presumably did not find what the user was looking for). In some embodiments, the user might also be prompted to rate how much better or worse the new result is.

In preferred embodiments, the assisted search module has a variety of possible modifications that may be tried, and different modifications are successively tried relative to the baseline query. The baseline query, initially the query entered by the user, may be switched to a modified query when the feedback indicates that the modification yielded an improvement. The assisted search module may advantageously keep track of what modifications have been tried for the user (successfully or unsuccessfully) and uses this information to avoid duplicating a previous search.

A variety of different modifications and responses to feedback may be implemented. For example, where generation of suggestions is implemented (for instance, in embodiments described in above-referenced application Ser. No. 10/713, 576), the modification might include using one or more of the suggestions as a new query. In some embodiments, a number of suggestions might be offered, with the user being prompted to select one. User feedback from the modified search can then be used to develop further suggestions.

In some embodiments, superunit information (e.g., as described in above-referenced application Ser. No. 10/797, 614) may also be used to modify queries. For example, if a unit of the query belongs to a given superunit, signature units of that superunit might be used to augment a modified query. The query may also be altered by searching for other members of the superunit in place of the member in the baseline query. User feedback from the modified search can then be used to determine whether further substitution or augmentation is appropriate.

In some embodiments, syntactic modifications to the query might also be performed. For example, if the query contains a string of two or more adjacent words that make up a single unit in the unit dictionary, the assisted search module might impose a proximity constraint on those words, e.g., requiring them to appear as a phrase. The modification might also involve instructing the search engine to ignore or include proximity requirements when ranking the hits. User feedback from the modified search can then be used to determine whether to retain or remove proximity constraints.

In some embodiments, the search corpus might also be modified. In one embodiment, the search corpus can be subdivided into a number of "properties," e.g., "shopping," "travel," "news," "computers" and so on, with searches being executed over the entire corpus or any combination of one or more of the properties. If a user is not satisfied with the results from searching one property, the assisted search module might execute the same query on a different property or combination of properties. In this context, features of the concept network (e.g., superunit membership) may be used to select a suitable property. For example, the unit "java" can belong to a "places" superunit and a "computer" superunit. Inferences as to which context of the term a given user had in mind might be made from other units in the query and used to select an appropriate property, such as selecting a "travel" property if the inference is that the user is interested in the island of Java and a "computer" property if the inference is that the user is interested in Java the computer language. User feedback from the modified search can then be used to determine whether to keep, change, or eliminate the selection of a property (or properties).

In some embodiments, category information might be modified. For example, as described in above-referenced application Ser. No. 11/006,466, a query can be categorized using one or more taxonomies. Where pages in the search corpus are also categorized using similar taxonomies, category information can be used to constrain the search. The search can be modified by selecting a different taxonomy (or combination of taxonomies) for categorizing the query and constraining the search according to the new categorization. Alternatively, the query's category within some taxonomy might be modified, e.g., by selecting a neighboring category at a higher or lower level of the taxonomy so that the search is less or more narrowly focused. User feedback from the modified search can then be used to determine whether to keep going to broader or narrower focus or to retain the current focus.

In addition to the feedback buttons described above, the assisted search module may solicit specific user input to help modify the search. For example, suppose the user's query is simply "java." The assisted search module might display the names of superunits to which the unit "java" belongs and prompt the user to select one; this information can then be used, e.g., to compose suggestions based on the selected superunit or to select a property to search. As another example, the user might be prompted to select among suggestions as described above. As yet another example, the assisted search module might execute searches using a number of suggestions and display a given number of results from each search, then prompt the user to indicate which result list looks most promising. The assisted search module may also propose several options for modifying the search (including, e.g., any combination of suggested queries, broader or narrower searches, or searches in different properties) and prompt the user to select an option to try.

In some embodiments, user feedback may be collected and used by a search engine provider to improve assisted search behavior. For example, during assisted search, data can be collected, including the original query, the modified query, and the feedback received for the modified query (e.g., improvement or not and, where applicable, an improvement score). This information can be analyzed to determine which types of modifications (e.g., syntactic, categorical, suggestion-based, superunit-based) tend to return generally good or generally poor results, thereby allowing refinement of the assisted search module.

In one such embodiment, the feedback is used to adjust relationship weights in a concept network. For instance, suppose that the modified query is one of the suggestions generated in response to the original query and includes a unit from the query (referred to herein as a "base" unit) and one or more related units. If the feedback indicates a favorable evaluation of the modified query, the relationship weight(s) between the base unit and the related unit(s) can be increased so that the suggestion may be more highly rated in future query processing operations. Similarly, if the feedback indicates an unfavorable evaluation, the relationship weight can be decreased. In these embodiments, user feedback may be aggregated over a number of users with similar queries.

In embodiments where users can identify themselves to the search server (e.g., by logging in), assisted search features may be personalized. For example, where the user's identity is known, feedback on modified searches may be associated with the user who provided it and used to affect features such as generation of suggestions or other assisted search operations only for that user.

In another embodiment, a search engine provides a "perturb" feature that allows a user to find content related to content he or she is currently viewing. For example, as is known in the art, a user's Web browser client may be modified to include a toolbar add-in supported by a search provider. The toolbar, which is generally regardless of the specific content that the user is viewing may include, e.g., a text box for entering a query, a button for linking to the search provider's home page, and other conventional features. In addition, in accordance with some embodiments of the present invention, the toolbar advantageously includes a "Perturb" button. The user may select this button while viewing any page, in response to the selection of which the search engine generates a list of sites with related content.

Figure 12:
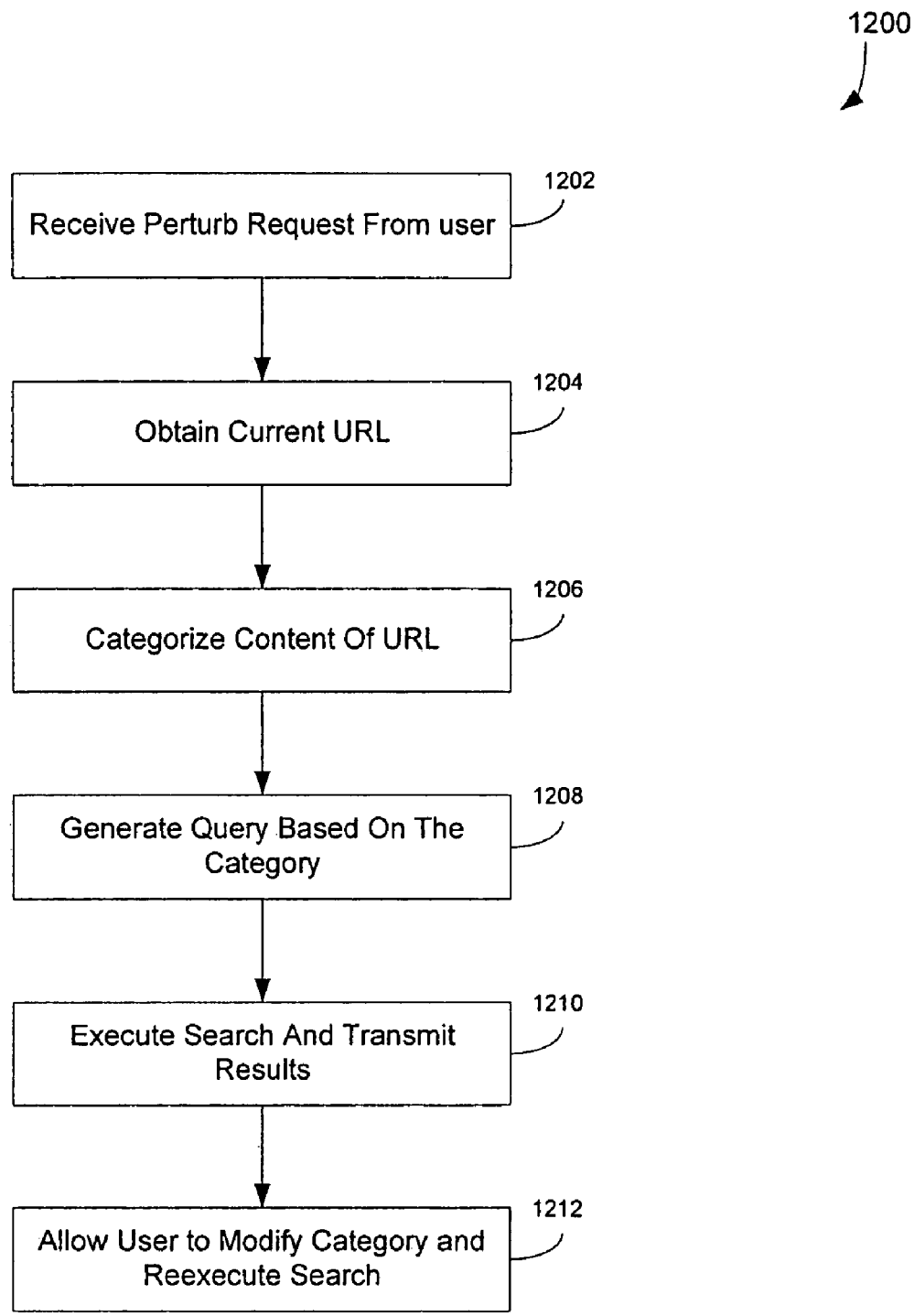
FIG. 12 is a flow diagram of a process for a query perturbation operation according to one embodiment of the present invention.

In one embodiment, the perturbation operation is done by a process 1200 illustrated in FIG. 12. Process 1200 begins when the search server receives a perturbation request from the user's toolbar, step 1202. The search server obtains the URL of the page the user is currently viewing, step 1204, which may be provided with the perturbation request, and processes the page to categorize its content, step 1206. Categorization may be done using conventional techniques, including detection of frequently occurring words or patterns of words in the entire document or in headings, other highlighted content, known categories of pages that are linked to by the page being processed, and/or other features of the page. Categorization advantageously includes placing the page at a node within a hierarchy, and multiple hierarchies may exist along different dimensions. Examples of generating taxonomies and categorizing content are described in above-referenced Provisional application Ser. No. 11/006,463 and Provisional application Ser. No. 11/006,466

After categorizing the page, at step 1208, the search server generates one or more queries based on the category information (e.g., by using the category labels as units and constructing one or more suggestions therefrom). The search (or searches, in the case of multiple queries) is executed and the results are displayed for the user, step 1210. Where multiple queries are used, a few results from each query might be shown.

The perturbation results page advantageously provides an interface via which the user can modify the category (or the query) and execute a new search, step 1212.

Figure 13:
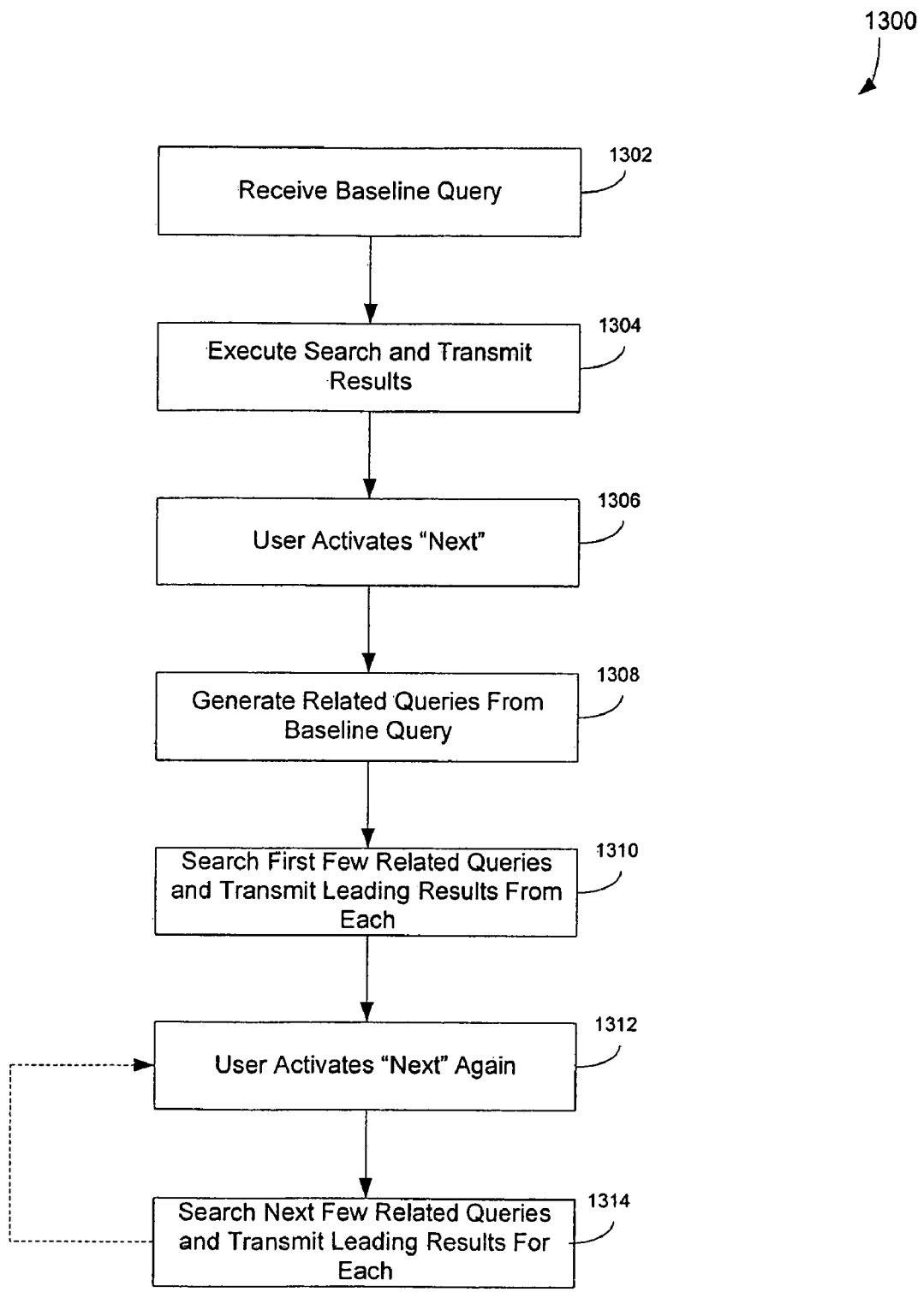
FIG. 13 is a flow diagram of a process for sequentially executing suggested searches according to one embodiment of the present invention.

In another embodiment of the invention, a user may execute multiple suggested searches sequentially, with each suggested search being generated from the same baseline query. FIG. 13 is a flow diagram according to one embodiment of the invention of a process 1300 that implements a "Next" button allowing the user to invoke this feature.

At step 1302, a baseline query is received from the user. For example, when a user enters a new query into a search box, that query may be taken as a new baseline query for that user. At step 1304, a search is executed for the baseline query, and the results are displayed for the user. The results page includes a "Next" button, which the user may activate, step 1306.

When the "Next" button is activated, the search server generates a number of related queries from the baseline query, step 1308, e.g., using suggestions as described above. The related queries are advantageously ranked according to likely relevance. At step 1310, a search is executed on a given number of the related queries, and the results are displayed. In one embodiment, a single page is presented with the first few hits from each of the related queries that was searched, and for each related query, a button is provided by which the user can elect to view the full results from one of these queries. This page also includes a "Next" button.

At step 1312, if the user activates the "Next" button again, the search server executes the next few related queries from the list generated at step 1308, again displaying a few results from each query, step 1314. The user may keep activating the "Next" button to search additional related queries and may choose to view the full results from any search. In some embodiments, a "Previous" button allowing a user to go back to a previous group of related searches may also be provided.

It should be noted that in this embodiment, the related searches are derived from a given baseline query. In some embodiments, the user may be offered the option to select a given related query as a new baseline query; at that point, process 1300 returns to step 1302 and generates a new set of related queries from the new baseline. In this way, an assisted search module can be implemented that allows the user to steer the search in a desired direction.

Selection of a "next," button, step 1312, might also be used to shift the search in directions other than suggestions. For example, the next sense or category for an ambiguous query term might be selected. Thus, in the case of "jaguar", a process similar to process 1300 might be used to identify different contexts in which the word might appear (e.g., animals, cars, computer operating systems, professional football) and allow the user to view search results related to each different sense.

In yet another embodiment, related queries can be used to search within a given location for relevant content. For example, if a user of a conventional search engine enters the query "printer," the home page of a major computer manufacturer may be returned as a hit. The user who follows that link generally has to navigate through the site to find a page that has details about available printers. Depending on how the manufacturer's site is organized, this can be cumbersome.

Some embodiments of the present invention provide a more efficient approach. For instance, in one embodiment, the user's query is executed together with one or more related queries (e.g., suggestions as described above), and results from both queries are sorted and merged (merging of results is described below). Using such a procedure, pages within a site that score highly for one of the related queries but not for the original query can be promoted in the rankings. To the extent that the related query may more closely reflect the user's intent, relevant content can rise toward the top of the results list, making it easier for the user to find. In addition, the results can be organized such that specific pages within the site (e.g., pages found using related queries) are shown near the main page of the site, allowing the user to quickly assess which pages on the site have the most relevant content.

In another embodiment, the user's original query is used to execute a search and identify a given relevant content site with hits; related queries are then used to search for specific pages within a given site. Some or all of the specific pages may be displayed in the results list together with the site's main page; the ranking of specific pages relative to the various queries can be used to determine which specific pages to display.

In one implementation, a search results page includes a "More results from this site" option associated with particular hits. This option causes one or more related queries to be executed, with results restricted to the hit site. It should be noted that existing systems that provide a "more from this site" option simply use the original query and do not introduce a related query.

Figure 14:
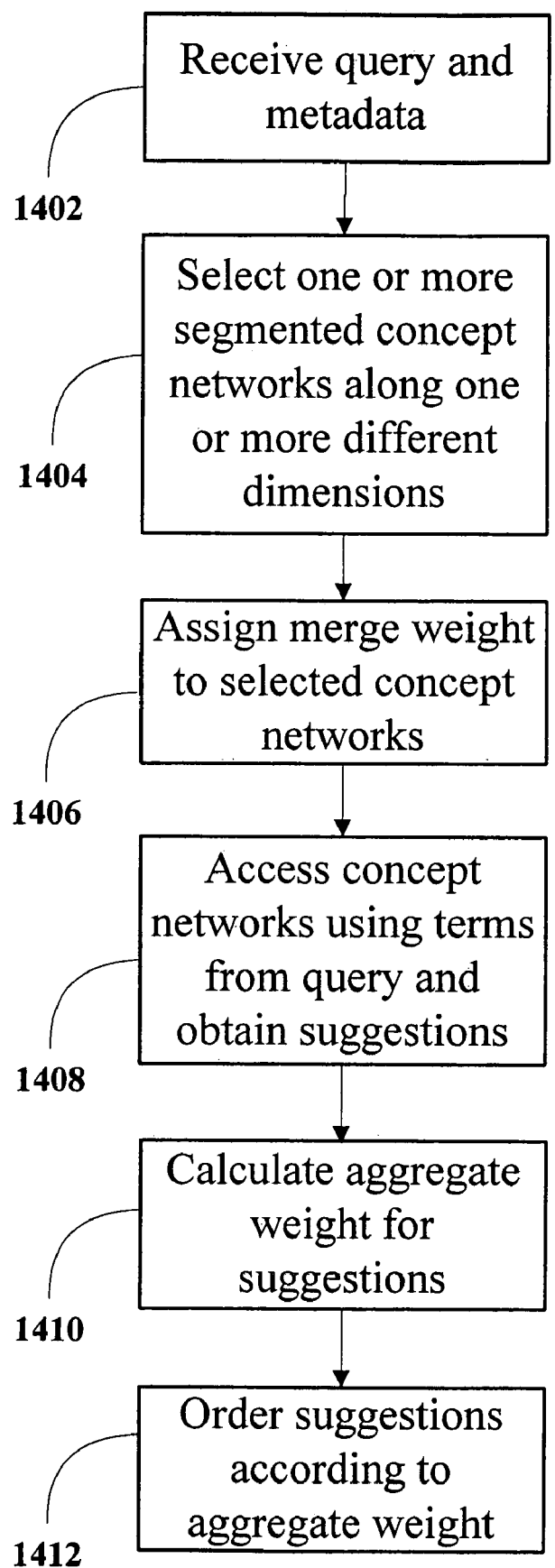
FIG. 14 is a flow diagram of a process for merging suggestions obtained from multiple concept networks according to one embodiment of the present invention.

In another embodiment, suggestions for related searches can be obtained from multiple concept networks. As noted above, concept networks can be generated in a segmented fashion, with the segmenting based on various dimensions such as time period, user demographics, geography, and "vertical" or contextual information. Concept networks for different segments may be different and thus generally yield different suggestions for a given query. One embodiment exploits this segmenting to find suggestions that are most likely to be of interest for a given user. FIG. 14 is a flow diagram illustrating one embodiment of a process for merging suggestions across multiple concept networks.

At step 1402, a query is received, along with metadata. The metadata may include, e.g., a user identifier that can be used to access demographic information about the user, a geographical identifier, the date and time of the query, and/or vertical information such as which property of the search provider the user was visiting when the query was entered. At step 1404, the metadata is used to select one or more segmented concept networks along one or more different dimensions. For instance, if the user is male and over 35, a concept network for "male users" and a concept network for "users over 35" might be selected. If the query came from the "Sports" property, a concept network specific to that property might also be selected. In addition, a time slice (e.g., last week, last month) may be selected for each concept network; different time slices may be selected for different concept networks. For instance, the selected concept networks may include a "sports" concept network covering the last two days (since sports interests tend to change rapidly) while the "male users" concept network might cover the last week or last two weeks.

At step 1406, a merge weight $W_m(i)$ is assigned to each selected concept network i. The merge weights can be determined empirically, based on which concept networks tend to return related queries that users actually pursue.

At step 1408, each selected concept network is accessed using terms from the query, and suggestions are obtained from each concept network. Some of the suggestions may overlap. For example, if the query is "jaguar," jacksonville jaguars may be a suggestion in both the "male users" and the "sports" concept networks. Some suggestions might be in fewer than all of the concept networks; for example, "jaguar xj6" might appear in the "male users" concept network but not the "sports" concept network.

At step 1410, for each distinct suggestions, an aggregate weight $W_T(s)$ is computed. 15 In one embodiment, the aggregate weight is given by:

$$W_T(s) = \sum_i W_m(i) * W_c(i) * W_s(c, i) \quad \text{(Eq. 3)}$$

where $W_c(i)$ represents the weight (e.g., frequency or normalized frequency) of the concept c in the ith selected concept network, $W_s(c,i)$ is the weight for the suggestion s in association with the concept c, and the sum is over all selected concept networks i. Where a concept c is not present in concept network i, $W_c(i)$ is advantageously set to zero, and where suggestion s is not present for concept c in concept network i, $W_s(c,i)$ is zero.

At step 1412, the aggregate weights $W_T(s)$ are used to order the suggestions for presentation to the user. A threshold can also be imposed such that suggestions with aggregate weights below the threshold are not presented to the user. Such a threshold may be defined as an absolute number or relative to the maximum $W_T(s)$ value over a particular set of suggestions.

It should be appreciated that this process is illustrative and that variations and modifications are possible.

In another embodiment, a similar technique may also be used to merge search results obtained across multiple overlapping search corpi. Each corpus is assigned a merge weight, and results within each corpus receive a normalized score. The final score for each result can be determined as a sum over the product of merge weight times normalized score for each corpus in which the result was returned. Similar techniques may also be used to merge search results obtained using multiple queries in parallel, e.g., in some of the assisted search technologies described above.

While the invention has been described with respect to specific embodiments, one skilled in the art recognizes that numerous modifications are possible. Techniques for merging concept networks, suggestions, and search results can be varied, as can the set of concept networks defined in a given implementation. The assisted search features described herein are also illustrative, and various embodiments may include all, some or none of these features, optionally in combination with still other assisted search features as desired. The automated systems and methods for forming concept networks described herein may be augmented or supplemented with human review of all or part of the results.

The embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found. Clickable buttons and other user interface control elements referred to herein may be replaced by any suitable alternative elements.

Thus, although the invention has been described with respect to specific embodiments, it should be appreciated that the invention is intended to cover all modifications and equivalents within the scope of the following claims.

What is claimed is:

1. A method for assisting a user with a search, the method comprising:

providing one or more concept networks, each concept network including a plurality of units and relationships among the units, wherein the relationships among the units are selected from a group consisting of extensions, associations and alternatives;

receiving a baseline query;

executing, using a processing device, a baseline search using the baseline query;

transmitting, using the processing device, a result of the baseline search to the user; and in response to a user request:

modifying, using the processing device, the baseline query to generate a modified query based at least in part on relationship information from at least one of the concept networks, the relationship information pertaining to at least one baseline unit extracted from the baseline query; executing a modified search using the modified query;

transmitting, using the processing device, to the user a result of the modified search; and prompting, via the processing device, the user to provide feedback on the result of the modified search, wherein the user feedback is usable to perform a further modification to at least one of the baseline query and the modified query.

2. The method of claim 1, wherein modifying the baseline query includes extracting from at least one of the concept networks a unit having an association relationship with the baseline unit.

3. The method of claim 1, wherein modifying the baseline query comprises:

identifying a superunit to which the baseline unit belongs;

identifying a second unit that is a member of a signature associated with the superunit; and adding the second unit to the baseline query.

4. The method of claim 1, wherein modifying the baseline query comprises:
- identifying a superunit of which the baseline unit is a member;
- identifying a second unit that is also a member of the superunit; and
- replacing the baseline unit with the second unit.

5. The method of claim 1, wherein modifying the baseline query comprises:
- using at least one of the concept networks to detect an extension relationship among two or more units in the baseline query; and
- replacing the two or more units with a new unit based on the extension relationship.

6. The method of claim 1, wherein modifying the baseline query comprises: selecting a different search corpus for performing the modified search.

7. The method of claim 1, wherein modifying the baseline query comprises:
- determining a category of the baseline query according to a predefined taxonomy;
- and modifying the in the taxonomy.

8. The method of claim 1, comprising: redefining the modified query as a new baseline query in response to receipt of positive feedback.

* * * * *